United States Patent [19]
Taguchi et al.

[11] 3,800,304
[45] Mar. 26, 1974

[54] ELECTRIC SHUTTER DEVICE HAVING AN EXPOSURE INDICATING CIRCUIT

[75] Inventors: Tatsuya Taguchi; Yuichiro Konishi, both of Tokyo, Japan

[73] Assignee: Canon Kabushiki Kaisha, Tokyo, Japan

[22] Filed: Mar. 21, 1972

[21] Appl. No.: 236,704

[30] Foreign Application Priority Data
Mar. 24, 1971  Japan.............................. 46-20592

[52] U.S. Cl. ............................................ 95/10 CE
[51] Int. Cl. ............................................ G03b 7/08
[58] Field of Search ............ 95/10 CE, 10 CT, 10 C

[56] References Cited
UNITED STATES PATENTS
3,670,634   6/1972   Kessler et al ........................ 95/10
3,487,757   1/1970   Kiper .............................. 95/10
3,460,450   8/1969   Ogihara ........................... 95/10

Primary Examiner—Samuel S. Matthews
Assistant Examiner—Michael L. Gellner
Attorney, Agent, or Firm—Toren & McGeady

[57] ABSTRACT

In a shutter control, a photoresistive element whose resistance varies non-linearly with changes in incident light forms part of a voltage divider with a variable resistor. The voltage divider contacts the output of a meter. The resistor, in turn, forms part of an RC circuit that controls the timing of a shutter. Through a movable contact arm, the photoresistive element contacts one of a series of equally spaced tabs that connect to the resistor in a non-linear sequence corresponding to the non-linearity of the photoresistive element. Through a second movable contact arm, the capacitor contacts one of a second series at equally spaced taps that connect to the resistor in a second non-linear sequence. The second sequence corresponds in non-linearity to the non-linearity of a succession of shutter speed adjustments. Adjustments of the shutter speed moves both arms simultaneously so that when the meter reads a predetermined value, the shutter speed corresponds to the light conditions. Adjustment of the film speed marker moves only the second arm.

25 Claims, 5 Drawing Figures

ELECTRIC SHUTTER DEVICE HAVING AN EXPOSURE INDICATING CIRCUIT

The present invention relates to an electric shutter device having an exposure indicating circuit, particularly which electric shutter device has a variable resistor which is used both for setting photographing informations of an exposure measuring circuit and for setting shutter time.

An electric shutter device has been conventionally known in which a variable resistor for setting shutter time and a variable resistor for setting photographing informations such as shutter time and film sensitivity, etc. are separately provided in a timer circuit containing a condenser and in an exposure measuring circuit containing a light receiving element.

However, the conventional device has a problem that it is difficult to obtain a light receiving element in which the ratio of the amount of incident light of the light receiving element to the output resistance characteristic value ($\gamma$ characteristic value) is "1", and for this reason two variable resistors have been used.

Namely, in an exposure measuring circuit using a light receiving element whose $\gamma$ characteristic value is other than "1", when the photographing informations are set in the variable resistor for setting photographing informations, the change in the resistance value must be determined in correspondence to the $\gamma$ characteristic value. This is because in case of an exposure measuring circuit using a light receiving element whose $\gamma$ characteristic value is other than "1", the change in the light amount does not take a linear change in the resistance value.

Supposing the light receiving element is Cds, the resistance value is expressed by the following equation $R\,cds = K/I^\gamma$ in which K is a constant, I is the amount of incident light and $\gamma$ is the characteristics of Cds.

The output resistance value of Cds when the amount of incident light to Cds is increased one-step, namely doubled is given as under:

$R\,cds' = K/(2I)^\gamma$
$= Rcds/2^\gamma$

The resistance value of the variable resistor must be changed in correspondence to the $\gamma$ characteristics of the light receiving element as above.

Namely, when the shutter time is changed from 1/100 to 1/50, the change of the resistance value must correspond to the change of $Rcds/2^\gamma$ On the other hand, the change of the set value of shutter time to be set in a variable resistor in RC time-delay circuit must be linear.

Based on the above reasons, the conventional electric shutter device having an exposure measuring circuit has necessity that a variable resistor for an exposure measuring circuit and a variable resistor for RC time-delay circuit are separately provided.

And for setting simultaneously the photographing informations using one photographing information setting member (for example, a shutter dial) for both of the variable resistors, it has been necessary to use two variable resistors having different characteristics, or to change the movement of a sliding member of each of the two variable resistors through a very complex mechanism.

The provision of the two variable resistors and the complicated mechanism causes great inconvenience in camera designing and increased cost.

The object of the present invention is to provide an electric shutter device having an exposure measuring circuit free from the above defects.

Another object of the present invention is to provide an electric shutter device having an exposure meter in which the functions of variable resistor of an exposure measuring circuit having a light receiving element having different $\gamma$ characteristics and the variable resistor of RC time-delay circuit can be attained by one variable resistor.

The examples of the present invention shall be explained referring to the attached drawings.

Figure 1:
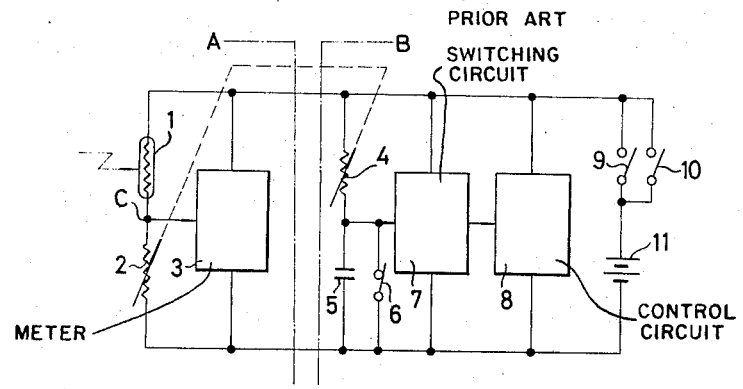
FIG. 1 shows a circuit of a conventional electric shutter device having an exposure measuring circuit.

Prior to the explanation of the embodiments of the present invention, explanation shall be made on a conventional electric shutter device having an exposure measuring circuit referring to the circuit shown in FIG. 1.

In FIG. 1 the left side of the dotted line A indicates the exposure measuring circuit and the right side indicates an electric shutter circuit.

1 is a light receiving element such as Cds, and the incident light amount — output resistance characteristic value ($\gamma$ characteristic value) of the light receiving element or a circuit including the light receiving element is other than "1". For convenience, the description will be made in case when the $\gamma$ value is 0.75. 2 is a variable resistor connected in parallel to the light receiving element 1, for setting photographing informations such as film sensitivity, shutter time, etc. onto the exposure measuring circuit A. C indicates a middle point between the light receiving element 1 and the variable resistor 2. 3 is an indicating circuit including an exposure meter (not shown), in which the amount of current through the exposure meter is changed in correspondence to the voltage at the point C. This indicating circuit is a circuit including a conventionally known amplifying transistor. 4 is a variable resistor for setting shutter time. 5 is a condenser which composes RC time-delay circuit together with the variable resistor 4. 6 is a normally closed start switch which opens in association with the opening action of a shutter mechanism (not shown). 7 is a switching circuit which effects switching when the charging amount across the condensor 5 reaches a certain value. 8 is a shuter controlling circuit including a magnet, etc. for closing of a shutter mechanism (not shown) through the switching of the switching circuit. 9 is a power source which closes by the push-down of a shutter release lever (not shown). 10 is a photo-metric switch, for example, a switch which closes by the downward rotation of the photometric lever and opens by the restoration of the photometric lever. 11 is a power source.

Next, explanation shall be made on the operations after the photographing informations are set in the variable resistors 2 and 4. By pushing down the photometric lever and the like, the photometric switch 10 is closed. In correspondence to the potential at the point C of the photometric circuit, the pointer (not shown) of the meter of the indicating circuit 3 swings.

By the swinging position of the pointer, diaphragm values are read by a photographer, and the diaphragm values are set in the diaphragm setting member (not shown). It is also possible that a mechanism for setting the diaphragm value automatically indicated to the camera by the meter by detecting the swinging angle of the meter pointer by conventional means such as a cramp plate and a saw-tooth.

After the diaphragm value is set to the diaphragm setting member of the camera, when the shutter release lever (not shown) is pushed down, the power source switch is closed. When the shutter release lever is further pushed down, the shutter mechanism (not shown) makes opening action. In association with this opening action, the start switch 6 opens. By the opening of the short-circuit switch the condenser 5 is charged through the resistor 4. When the charge across the condenser 5 reaches a certain value, the switching circuit 7 makes switching action and the shutter is closed through the shutter controlling circuit 8. When the pushing-down of the shutter release lever is stopped, or in association with the film winding-up, the switches 6 and 9 return to their original position.

In the conventional electric shutter device having an exposure measuring circuit shown in FIG. 1, two different variable resistors 2 and 4 are provided each of the photo-metric circuits 1 and 2 and RC time-delay circuits 4 and 5 for the reasons set before.

The present invention provides an electric shutter device in which the functions of the two variable resistors 2 and 4 are conducted by one variable resistor.

Figure 4:
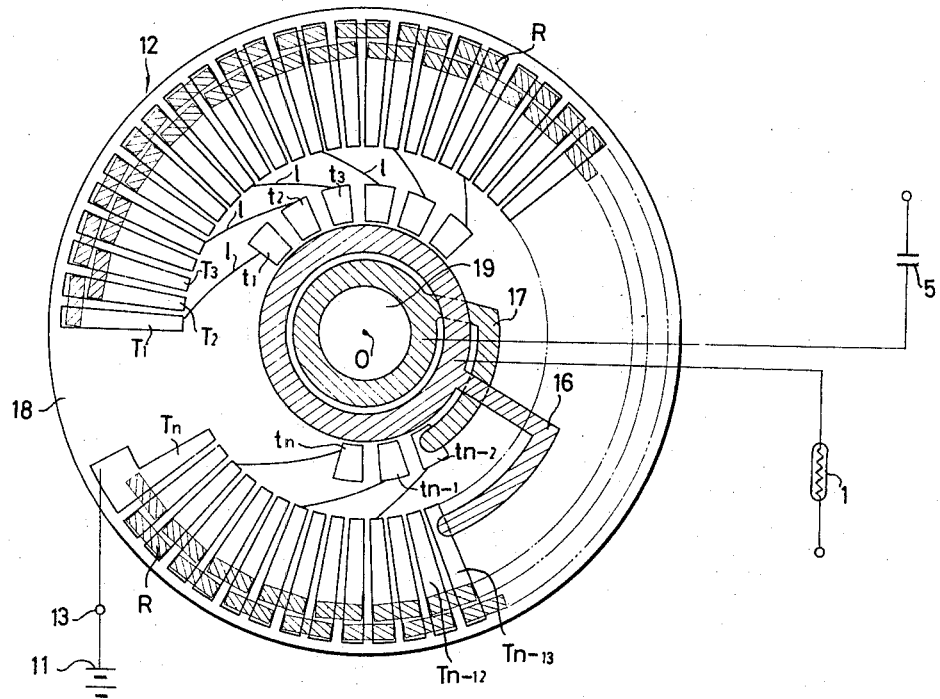
FIG. 4 shows a variable resistor used in the present shutter device having an exposure measuring circuit.
Figure 2:
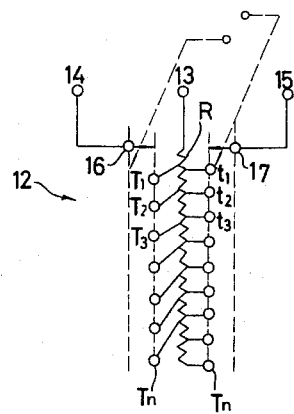
FIG. 2 shows a variable resistor used in the present electric shutter device having an exposure measuring circuit.
Figure 3:
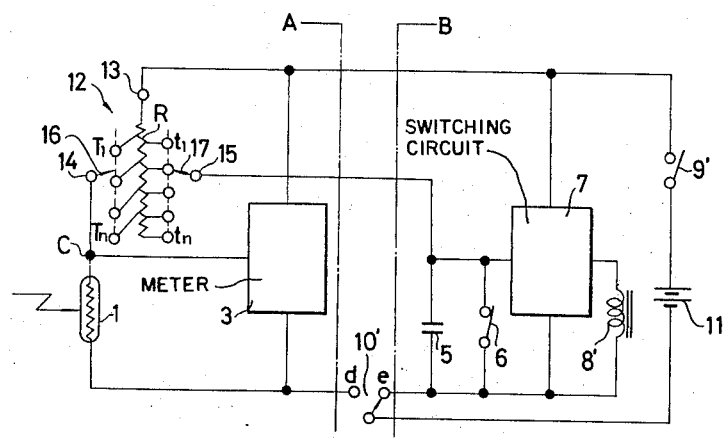
FIG. 3 shows a circuit of the present electric shutter device having an exposure measuring circuit.

The examples of the present invention shall be made referring to FIGS. 2, 3 and 4.

FIG. 2 shows the variable resistor 12 used in the present electric shutter device. 13 is a terminal connected to the power source. 14 is a terminal connected to the light receiving element 1. 15 is a terminal connected to the condenser 5. 16 is a first connecting member connected to the tap group $T_1, T_2 \ldots T_n$. 17 is a second connecting member connected to the tap group $t_1, t_2 \ldots t_n$. R is a resistor. The widths between individual taps of the tap groups $T_1 - T_n$ and $t_1 - t_n$ are same and it is desirable that the taps $t_1 - t_n$ corresponding to the taps $T_1 - T_n$ are positioned on a straight line.

Each tap of the tap group $t_1 - t_n$ is connected to the resistor R, and its connection position is one which increases the resistance value by two times at each tap. Namely, the taps $t_x, t_{x+1}$ are connected to the resistor R in such a manner that the resistance value increases by two times when the shutter time is set from 1/100 to 1/50.

On the other hand, each tap of the tap group $T_1 - T_n$ is connected to the resistor R, and its connection position is one which increases the resistance value by four times each four steps. The reason for positioning the taps as above are only for explanation of the case where a light receiving element whose γ characteristic value is 0.75 is used. Therefore, as explained before, as the change of the resistance value for each step of the shutter time, etc. is different dependent on the γ characteristic values, and for example when a light receiving element whose γ characteristic value is 0.5 is used in the photometric circuit, the tap of the tap group $T_1 - T_n$ must be arranged so as to produce the resistance value change of $2^n$ times.

The connecting elements 16 and 17 move in the same amount in association with the shutter setting member when the shutter time is set in the shutter setting member. The photographing information (film sensitivity, etc.) other than the shutter time are set by moving only the irst connecting element 16. A suitable device for setting these photographing informations will be explained in detail in connection with the explanation of FIG. 4.

FIG. 3 shows a circuit of the present electric shutter device using the variable resistor 12 shown in FIG. 2.

In FIG. 3, 10' is a switch which switches from the contact point e to the contact point d by the push-down of the photometric lever (not shown) and returns to the connection point e by the restoration of the photometric lever. The power source switch 9' is so arranged as to open and close in association with this change-over.

The power source switch, as explained referring to FIG. 1, is so designed as to close also by the push-down of the shutter release lever (not shown). Namely, the power source switch 9' is so constructed as to close either by the downward rotation of the photometric lever or by the push-down of the shutter release lever.

Explanations will be made on the operations of the circuit shown in FIG. 3. The photographing informations are set in the variable resistor 12 by the photographing information setting member, and the switch 10' is changed over from the contact point e to the contact point d by the photometric lever, etc. (not shown). At this time, the power source switch 9' is also closed. Therefore, the photometric circuits 12 and 1 and the indicating circuit 3 are brought into operative condition, but the RC time-delay circuit and the switching circuit as well as the shutter control circuit remain in non-operative condition. The meter pointer of the indicating circuit 3 is read and the diaphragm value is set in the camera in a similar way as in FIG. 1. After the exposure has been measured, the change-over switch 10' is changed over from the contact point d to the contact point e by the restoration of the photometric lever (not shown), and the photometric circuits 12 and 1 and the indicating circuit 3 are brought into non-operative condition while the RC time-delay circuit, the shutter control circuit 8, etc. are brought into operative condition. After this, the exposure is done similarly in FIG. 1 by the push-down of the shutter release lever (not shown).

FIG. 4 shows the variable resistor 12 which associates with the photographing information setting member (not shown). In FIG. 4 the resistor R is a resisting element in the pallet form having some resistance value. The resistance element R is fixed so that only two taps are connected to the tap group $T_1 - T_n$. The taps $T_1 - T_n$ are arranged radially on the inside circumference around the point O, and the taps $t_1 - t_n$ are arranged radially on the outside circumference around the point O, and they are fixed by the plate 18. The plate 18 is made of insulating material. The taps $t_1 - t_n$ are connected to each four of the taps $T_1 - T_n$ through the lead wire L. The tap $t_1$ is connected to the tap $T_1$ and the tap $t_2$ is connected to the tap $T_4$. 17 is a connecting element which rotates around the point O and is connected to the taps $t_1 - t_n$ one by one. 16 is a connecting element which rotates around the point O and is connected to the taps $T_1 - T_n$ one by one. These connecting elements 16 and 17 rotate by the same angle in association with the rotation of the rotating shaft 19 of the shutter time setting member (not shown), and change the connection between the taps $T_1 - T_n$ and $t_1 - t_n$. The connecting element 16 rotates irrespective of the connecting element 17 and changes the connection of the taps $T_1 - T_n$, when the photographing informations, other than the shutter time, such as film sensitivity and guide number are to be set. When the shutter time is to be set, the two elements associate with each other and rotate by the same angle, and when the other photographing informations are to be set only one of the two elements is rotated independently on the other element. The rotation mechanism can be effected by a known mechanism. For example, such mechanism is incorporated in a single lens reflex camera "CANON FT" sold widely in the world by Canon K.K.

Figure 5:
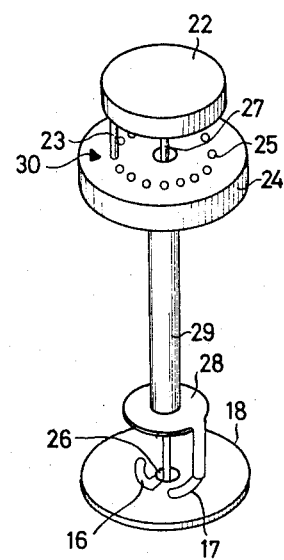
FIG. 5 is a perspective view of the shutter time and film sensitivity setting member.

The member for setting shutter time and film sensitivity, shown in FIG. 5 is constructed as under.

22 is a dial for setting film sensitivity, below which dial there is provided a pin 23. 24 is a dial for setting shutter time. 25 indicates a plurality of openings provided on the shutter time setting dial 24, in which the pin 23 is engaged. 26 is a disk on which the connecting elements 14 and 15 are provided. This disk 26 is associated with the film sensitivity setting dial 22 through 27. 28 is a disk on which the connecting terminal 18 is provided. This disk 28 is associated with the shutter time setting dial 24 through the lever 29. The numerals marked on the upper surface of the film sensitivity setting dial are set to the indication 30 provided on the shutter time setting dial 27, with the pin 23 being disengaged with the opening 25. At the time of the setting, the connecting elements 14 and 15 are rotated irrespective of the connecting element 18, because the shutter time setting dial 24 is not associated with the dial 22 through the pin 23. After the film sensitivity is set, the film sensitivity setting member 23 and the shutter time setting member 24 are brought into association with each other by insertion of the pin 23 into the opening of the dial 24. Therefore, when the shutter time setting dial 24 is rotated, the connecting elements 14 and 15 are also rotated by the same angle in association with the contact element 18.

The operation of the variable resistor 12 shall be explained hereinunder.

The photographing informations other than the shutter time are set by rotating the connecting element 16 independently on the connecting element 17, then the connecting elements 16 and 17 are rotated by the same angle to set the shutter time. Namely, when the connecting element 17 is connected to the tap $t_{n-1}$ and the connecting element 16 is connected to the tap $t_{n-12}$, the connecting elements 17 and 16 are connected respectively to the tap $t_{n-2}$ and the tap $t_{n-13}$, if the shutter time is delayed by one step, and the resistance value between the power source 11 and the connecting element 17 is changed by one step and the resistance value between the power source 11 and the connecting element 16 is changed only by $1/(2I)^\gamma$ steps.

What is claimed:

1. An electric shutter control device, comprising:
a power source;
exposure indicating circuit means including a photosensitive element having a light output-resistance characteristic value $\gamma$ other than 1, first exposure factor setting means for setting the shutter speed, and indicating means connected with said photosensitive element for indicating an exposure value;
electric shutter circuit means having a timer circuit including a capacitor, second exposure factor setting means for setting a shutter speed and connected to said capacitor, a switching circuit having an input connected with the connection between said capacitor and said second exposure factor setting means;
resistor means having a resistance member;
a first group of electric terminals each conected to different parts of said resistance member and defining a variable resistance together with one point of said resistance member, said terminals being connected to the resistance member in a sequence to change the resistance of said resistance member in a manner corresponding to the characteristic value $\gamma$ other than 1 of said photosensitive element;
first connecting means selectively connecting one of said first group of terminals and connecting at least one part of said resistance member to said exposure-indicating circuit, said connecting means being operatively associated with said first exposure factor setting means;
a second group of electric terminals, each of said terminals being connected respectively to a different part of said resistance member to define a variable resistance with a point of said resistance member having a resistance characteristic different from the characteristic of said element;
second connecting means selectively connecting one of said second group of terminals and connecting at least one part of said resistance member to said capacitor for forming a time constant circuit with said capacitor, said connecting means being coupled with said second exposure factor setting means;
coupling means coupling said first and second connecting means for simultaneous movement; and
switching means for selectively connecting said power source with said exposure-indicating circuit and electric shutter circuit for energizing one of said circuits electrically.

2. An apparatus as in claim 1, wherein: said light-receiving element is a CdS element.

3. An apparatus as in claim 1, further comprising:
means for setting photographic information other than the shutter time; and
coupling means for connecting said means for setting other photographic information to one of said connecting means.

4. A photographic shutter apparatus comprising light responsive means having an output value that changes according to a given characteristic with variation in the light incident thereon; variable resistive means exhibiting a resistance value and coupled to said light responsive means for establishing a signal corresponding to light being measured; meter means for reading the value of the signal; control means responsive to said resistive means for producing an exposure condition in response to the condition of said resistive means; exposure setting means movable for setting an exposure whose values change according to a given program;

said resistive means having first movable tap means for varying the resistance value exhibited by said resistive means according to the characteristic of said light responsive means when said first tap means is moved along the predetermined path; second movable tap means in said resistive means for varying the resistance value exhibited by said resistive means according to the given program of said exposure setting means when said second tap means is moved along the predetermined path; and coupling means for coupling said setting means to said first and second tap means so as to move said first and second tap means in unison with said setting means; said first and second tap means simultaneously varying the resistance value at different rates of change.

5. An apparatus as in claim 4, wherein:
said control means includes shutter speed control means for producing a shutter speed in response to the condition of said resistive means; and
wherein said exposure setting means includes shutter speed setting means.

6. An apparatus as in claim 5, further comprising:
exposure information means movable to one of a plurality of positions and coupled by said coupling means to move said first tap means along the predetermined path.

7. An apparatus as in claim 6, wherein:
said exposure information setting means includes means for setting the film sensitivity.

8. An apparatus as in claim 7 wherein:
said resistive means includes a single extended resistance and said first and second tap means connect to said resistance at different points.

9. An apparatus as in claim 7, wherein:
said control means includes a capacitor forming an RC circuit with said resistive means; and
a switching circuit coupled to said capacitor for operation on the basis of the charge across said capacitor.

10. An apparatus as in claim 6, wherein:
said resistive means include a single extended resistance and said first and second tap means connect to said resistance at different points.

11. An apparatus as in claim 6, wherein:
said control means includes a capacitor forming an RC circuit with said resistive means; and
a switching circuit coupled to said capacitor for operation on the basis of the charge across said capacitor.

12. An apparatus as in claim 5, wherein:
said control means includes a capacitor forming an RC circuit with said resistive means;
and a switching circuit coupled to said capacitor for operation on the basis of the charge across said capacitor.

13. An apparatus as in claim 5, wherein:
said light responsive means includes a photoresistive element series connected with said resistive means at said first tap means, said photoresistive means having a resistance that changes according to the given characteristic.

14. An apparatus as in claim 4, wherein:
said resistive means includes resistance means;
said first tap means including a plurality of taps connected to said resistance means in a sequence which varies the resistance of said resistance means according to the characteristic of said light responsive means;
said first tap means including an armature for contacting said taps, said armature being movable along the path;
and wherein said second movable tap means includes a plurality of uniformly spaced taps contacting said resistance means in a sequence according to the given program of said exposure setting means;
said second tap means including a second armature contactable with the tap means and movable along the predetermined path.

15. An apparatus as in claim 14, further comprising:
exposure information means movable to one of a plurality of positions and coupled by said coupling means to move said first tap means along the predetermined path.

16. An apparatus as in claim 15, wherein:
said exposure information setting means includes means for setting the film sensitivity.

17. An apparatus as in claim 16, wherein:
said resistance means includes a single extended resistance and said first and second tap means connect to said resistance at different points.

18. An apparatus as in claim 16, wherein:
said control means includes a capacitor forming an RC circuit with said resistive means; and
a switching circuit coupled to said capacitor for operation on the basis of the charge across said capacitor.

19. An apparatus as in claim 18, wherein:
said light responsive means includes a photoresistive element series connected with said resistive means at said first tap means.

20. An apparatus as in claim 15, wherein:
said resistance means includes a single extended resistance and said first and second tap means connect to said resistance at different points.

21. An apparatus as in claim 15, wherein:
said control means includes a capacitor forming an RC circuit with said resistance means; and
a switching circuit coupled to said capacitor for operation on the basis of the charge across said capacitor.

22. An apparatus as in claim 14, wherein:
said resistance means includes a single extended resistance and said first and second tap means connect to said resistance at different points.

23. An apparatus as in claim 14, wherein:
said control means includes a capacitor forming an RC circuit with said resistance means; and
a switching circuit coupled to said capacitor for operation on the basis of the charge across said capacitor.

24. An apparatus as in claim 4, wherein:
said resistive means include a single extended resistance and said first and second tap means connect to said resistance at diferent points.

25. An apparatus as in claim 4, wherein:
said light responsive means includes a photoresistive element series connected with said resistive means at said first tap means.

* * * * *